(12) United States Patent
Winter (10) Patent No.: US 11,977,012 B2
(45) Date of Patent: May 7, 2024

(54) APPARATUS AND METHOD FOR THE THERMAL TREATMENT OF SAMPLES

(71) Applicant: Analytik Jena GmbH, Jena (DE)

(72) Inventor: Stefan Winter, Dornburg-Camburg (DE)

(73) Assignee: Analytik Jena GmbH+Co. KG, Jena (DE)

( * ) Notice: Subject to any disclaimer, the term of this patent is extended or adjusted under 35 U.S.C. 154(b) by 388 days.

(21) Appl. No.: 17/438,995

(22) PCT Filed: Feb. 14, 2020

(86) PCT No.: PCT/EP2020/053903
§ 371 (c)(1),
(2) Date: Sep. 14, 2021

(87) PCT Pub. No.: WO2020/187503
PCT Pub. Date: Sep. 24, 2020

(65) Prior Publication Data
US 2022/0155195 A1    May 19, 2022

(30) Foreign Application Priority Data

Mar. 15, 2019   (DE) ..................... 10 2019 106 699.9

(51) Int. Cl.
*G01N 1/44*        (2006.01)
*B01L 3/00*        (2006.01)
(Continued)

(52) U.S. Cl.
CPC ............ *G01N 1/44* (2013.01); *B01L 3/50851* (2013.01); *B01L 3/50853* (2013.01); *B01L 7/52* (2013.01);
(Continued)

(58) Field of Classification Search
CPC ........ G01N 1/44; G01N 1/42; B01L 3/50851; B01L 3/50853; B01L 7/52;
(Continued)

(56) References Cited

U.S. PATENT DOCUMENTS 5,552,580 A     9/1996  Pfost et al.
9,492,825 B2   11/2016  Howell et al.
(Continued)

FOREIGN PATENT DOCUMENTS

DE         69914220 T2    11/2004
DE         60026834 T2    11/2006
WO       2017112836 A1     6/2017

*Primary Examiner* — Suman K Nath
(74) *Attorney, Agent, or Firm* — Christopher R. Powers; Endress+Hauser (USA) Holding, Inc.

(57) ABSTRACT

An apparatus for the thermal treatment of samples within sample containers comprises: a sample block a receiving region for the sample containers; a first temperature-control device thermally coupled to the sample block designed to set a temperature of the sample block; a cover plate arranged in the receiving region of the sample block; a second temperature-control device thermally coupled to the cover plate and designed to set a temperature of the cover plate; and a control unit connected to the first and the second temperature-control devices and designed to control the first and the second temperature-control device as to control the temperature of the sample block and the temperature of the cover plate such that the temperatures are coordinated with one another. A method for the thermal treatment of samples contained in sample containers is also disclosed.

21 Claims, 2 Drawing Sheets

(51) Int. Cl.
*B01L 7/00* (2006.01)
*G01N 1/42* (2006.01)

(52) U.S. Cl.
CPC ............ *G01N 1/42* (2013.01); *B01L 2200/12* (2013.01); *B01L 2300/042* (2013.01); *B01L 2300/046* (2013.01); *B01L 2300/0829* (2013.01); *B01L 2300/1822* (2013.01); *B01L 2300/1894* (2013.01)

(58) Field of Classification Search
CPC ........... B01L 2200/12; B01L 2200/147; B01L 2300/042; B01L 2300/046; B01L 2300/0829; B01L 2300/1822; B01L 2300/1894; B01L 2300/044
See application file for complete search history.

(56) References Cited

U.S. PATENT DOCUMENTS

| | | |
|---|---|---|
| 9,776,187 B2 | 10/2017 | Atwood et al. |
| 10,076,757 B2 | 9/2018 | De Vos |
| 2009/0165574 A1 | 7/2009 | Cohen et al. |
| 2015/0367348 A1* | 12/2015 | Sano .................... B01L 7/5255 435/286.1 |
| 2016/0303566 A1* | 10/2016 | Lee ....................... B01L 7/5255 |

* cited by examiner

PRIOR ART

APPARATUS AND METHOD FOR THE THERMAL TREATMENT OF SAMPLES

CROSS-REFERENCE TO RELATED APPLICATIONS

The present application is related to and claims the priority benefit of German Patent Application No. 10 2019 106 699.9, filed on Mach 15, 2019, and International Patent Application No. PCT/EP2020/053903, filed on Feb. 14, 2020, the entire contents of which are incorporated herein by reference.

TECHNICAL FIELD

The invention relates to an apparatus and a method for the thermal treatment of samples contained in sample containers, especially for DNA amplification.

BACKGROUND

In laboratory analysis, there is a number of applications in which a plurality of small sample volumes are treated and examined simultaneously. An example of such an application that plays a major role in DNA analysis is the polymerase chain reaction (PCR) with which the smallest DNA quantities can be amplified. PCR requires a thermal treatment of the samples in which they are repeatedly subjected to a thermal cycle. Such a cycle typically consists of a denaturation phase at a high temperature (e.g., 94 to 100° C.), a primer hybridization phase at a low temperature (e.g., 55 to 65° C.), and an elongation or amplification phase at a medium temperature (e.g., 60 to 72° C.). Typically, the samples are subjected to this cycle approximately 30 times.

In some applications, an analysis using optical measuring methods is carried out simultaneously with the amplification of the sample. Said applications are also referred to as "real-time PCR".

A plurality of laboratory devices adapted to the respective application exists for the thermal treatment of samples. A simple metal block thermostat, which allows the simultaneous thermal treatment of a plurality of samples, is known from the German utility model G 9205824 U1. In contrast to such a simple metal block thermostat, it is necessary for heat to be transferred into the samples or removed therefrom as quickly as possible in order to realize short process times in the aforementioned number of treatment cycles, for example in PCR. So-called thermocyclers are conventionally used for carrying out PCR. These devices have a thermoblock on which the sample containers are placed and which is designed to control the temperature of the sample containers. In order to control the thermal treatment of the samples, the thermocyclers have control electronics which are designed to control the temperature of the samples in accordance with a desired temperature profile in a value range between 4° C. and 100° C. It is a distinct advantage for the user if this temperature change can be carried out with as steep a temperature profile as possible and thus with many cycles in as short a time as possible. Ideally, the 30 cycles mentioned above only take a few minutes.

Thermoblocks of conventional thermocyclers frequently have a sample block intended for receiving sample containers, Peltier elements which can be controlled by the control electronics for heating and cooling the sample containers, and a heat sink in contact with the Peltier elements, for example in the form of cooling elements. The Peltier elements are thereby sandwiched between the sample block and the heat sink so that the heat sink dissipates waste heat arising thereby enabling a faster temperature change.

The sample block forms a receiving region for the sample containers. In said receiving region, the sample block can have recesses in which the individual sample containers engage when they are arranged in the receiving region. The sample containers are often combined in a microtiter plate. In many microtiter plates, the sample containers are formed by recesses (so-called wells). So-called 96 and 384 microtiter plates produced from polypropylene on injection molding machines are customary for this purpose. Microtiter plates which have a hard frame overmolded from a second plastic or plastic mixture and are therefore more robust to handle are also customary but significantly more expensive. These plates are also referred to in technical language by the term "hard skirted plates." Depending on the intended use of the microtiter plate, the wells can have various shapes. Frequently, the sample block of the thermocycler is designed in such a way that it can positively receive the individual wells of the microtiter plate in the aforementioned recesses in the receiving region.

In order to avoid sample losses due to evaporation, the individual sample containers can be closed or sealed. For this purpose, the individual sample containers can each have their own closure or a plug made of an insulating material, for example wax, which cannot be mixed with the sample. Microtiter plates can be covered by means of a sealing mat or a sealing film which closes the wells tightly. However, a small amount of water always evaporates from the sample liquid within each sample container and is precipitated in cooler regions of the sample container by condensation. This has several disadvantages: On the one hand, this can result in an undesirable concentrating of the sample. On the other hand, drops formed by condensation may get stuck on the sealing film and impair an optical in situ measurement in real-time PCR applications.

In order to avoid this condensation and the associated disadvantages, a heatable cover plate for the sample containers is frequently used in thermocyclers, which cover plate is placed on and optionally pressed against the sample containers or onto a sealing film or sealing mat covering the sample containers. Typically, the cover plate is maintained at a temperature that is approximately 5 K above the highest temperature occurring in the temperature profile of the sample block. Such a thermocycler with a heatable cover plate is described, for example, in U.S. Pat. No. 9,776,187 B2.

A disadvantage of this solution is that, in certain phases of the cycle, for example in a cooling phase, a large temperature difference occurs between the sample block and the cover plate, and thus a large temperature gradient occurs across the sample containers. In the cooling phase, the sample block can cool the sample to temperatures below 70° C., while the cover plate continues to remain at a temperature which can be 5 K above the maximum temperature of the PCR temperature cycle, for example, close to 100° C. The high temperature gradient leads to an undesired heat input from the cover plate into the samples during the cooling phase. As a result, the final temperature of the cooling phase is reached only with a delay prohibits a further reduction in the cycle duration.

The influence of the heated cover plate on the temperature of the samples can be kept to a minimum by means of the largest possible contact area between the sample containers and the sample block. For PCR applications, therefore, microtiter plates with conical wells and corresponding sample blocks with conically-designed recesses in the receiving region are frequently used for the microtiter plates. This embodiment ensures a relatively large contact area between the wells and the sample block, which allows good thermal coupling so that the influence of the heated cover plate remains low and the temperature of the samples follows the temperature profile of the sample block with only a slight delay.

As a further measure for improving the heat coupling between sample block and sample containers, DE 69914220 T2 proposes the use of sample containers with as thin walls as possible. Said sample containers can be designed as wells of a microtiter plate which can be produced from a thin thermoplastic film by thermoforming or vacuum molding. For automated handling by a robot, the microtiter plates can comprise a frame which supports the edges of the plates or individual recesses. Said frame can be injection-molded and joined to the film forming the thin-walled sample containers by heat bonding. However, this assembly of deep-drawn parts and injection-molded parts is relatively complex and correspondingly costly.

DE 60026834 T2 describes the use of said special microplates in a very fast thermocycler. The applicant also brought such a thermocycler to market under the name speedCYCLER™. The aforementioned typical 30 cycles can thus be completed significantly more quickly than half an hour.

An analogous approach is described in U.S. Pat. No. 10,076,757 B2. Here, a plurality of temperature blocks are used between which the extremely thin-walled microtiter plate changes position. This allows for even faster temperature changes. The change in position of the microtiter plates is associated in each case with the mechanical pressing into recesses of the temperature blocks. However, such an arrangement is mechanically complex and may be susceptible to wear.

U.S. Pat. No. 9,492,825 describes a special microtiter plate for PCR applications consisting of materials with varying degrees of heat conductivity. In the region of its base surface intended for contact with the sample block, it is formed from a relatively highly thermally conductive material, while in a region intended for contact with the cover plate, it is formed from a relatively thermally insulating material. In the region of the highly thermally conductive material, recesses are additionally formed which project into receptacles of the sample block and, corresponding to an increase in the contact surface, bring about a better heat transfer into the sample, thus enabling the rapid execution of PCR reaction cycles. However, this solution requires a complexly formed surface of the sample block and a PCR plate consisting of two different materials. This also makes the production of the sample block and of the microtiter plate complex and expensive.

The aforementioned geometric and material-related embodiments of the microplates can have a significant influence on the cycle speeds. Nevertheless, even when these microplates are used, the cover plate, temperature-controlled to 5 K above the maximum temperature of the PCR temperature cycle, counteracts the cooling cycles of the sample block. This effect is clearly pronounced in relatively flat, very thin-walled microplates, as described, for example, in DE 699 14 220 T2 or used in the aforementioned speedCycler™, and results in a reduction in the possible cycle frequency.

SUMMARY

Said object is achieved according to the invention by the apparatus and the method according to the present disclosure. Advantageous embodiments of the apparatus and the method are also disclosed.

The invention is therefore based on the object of specifying an improved apparatus and an improved method for the thermal treatment of samples contained in sample containers. Especially, the apparatus or the method should ensure that even samples contained in low sample containers, e.g., in microtiter plates for small volumes, are subjected to a desired temperature profile as precisely as possible and at high speed.

Said object is achieved according to the invention by the apparatus according to claim 1 and the method according to claim 14. Advantageous embodiments are listed in the dependent claims.

The apparatus according to the invention for the thermal treatment of samples contained in sample containers comprises: a sample block with a receiving region for the sample containers; a first temperature-control device which is thermally coupled to the sample block and is designed to set a temperature of the sample block; a cover plate for sample containers arranged in the receiving region of the sample block; a second temperature-control device thermally coupled to the cover plate and designed to set a temperature of the cover plate; and a control unit which is connected to the first and the second temperature-control devices and is designed to control the first and second temperature-control device, characterized in that the control unit is designed to control the temperature of the sample block and the temperature of the cover plate by means of the first and the second temperature-control device so that said temperatures are coordinated with one another.

The apparatus may, for example, be a thermocycler for carrying out PCR on samples contained in the sample containers. In contrast to conventional thermocyclers with heatable cover plate for the sample containers, in which the heatable cover plate is kept at a constant temperature independently of the temperature of the sample block, the apparatus according to the invention is designed to control the temperature of the cover plate so that it is coordinated with the temperature of the sample block. This makes it possible, on the one hand, to control the temperature of the cover plate in such a way that undesired condensate is prevented from forming on a cover of the sample containers and, on the other hand, to reduce the influence of the heated cover plate on the sample temperature so that rapid and precise setting of desired sample temperatures is possible.

In a first embodiment, the control unit can be designed to control the temperature of the cover plate and the temperature of the sample block in such a way that the temperature of the cover plate is equal to or greater than the temperature of the sample block, and that a difference between the temperature of the cover plate and of the sample block does not exceed an, especially predetermined, maximum value.

Due to the fact that the control unit controls the temperature of the sample block and of the cover plate so that said temperatures are coordinated with one another such that the temperature of the cover plate is, on the one hand, equal to or greater than the temperature of the sample block, whilst on the other hand, however, the difference between the temperature of the cover plate and that of the sample block does not exceed a maximum value, on the one hand the formation of condensate on a cover closing the sample containers is avoided. On the other hand, a temperature gradient forming over the sample between the cover plate and the sample block is controlled in a targeted manner and ideally kept as low as possible, and the influence of the cover plate on the sample temperature is thus reduced.

The maximum value of the temperature difference may depend on the type of application, for example on the condition of the sample containers and on the temperature profile of the samples that is to be set. Advantageously, the maximum value of the temperature difference is substantially smaller than the difference between the highest and lowest temperature setpoint of the sample block to be set by the control unit, for example smaller than half the difference of the highest and lowest temperature setpoint of the sample block. Even more advantageously, the maximum value of the temperature difference is less than one quarter or even less than one tenth of the difference of the highest and of the lowest temperature setpoint of the sample block. In absolute values, the maximum value of the temperature difference between the temperature of the cover plate and of the sample block may be less than 10 K, especially less than 5 K.

The control unit can be designed to control the temperature of the cover plate and the temperature of the sample block so that said temperatures are coordinated with one another such that it controls the temperature of the cover plate as a function of the temperature of the sample block.

The control unit may, for example, comprise a first controller which is designed to control, especially cyclically, the temperature of the sample block by means of the first temperature-control device according to a predetermined setpoint temperature profile.

It may further comprise a second controller which is designed to control the temperature of the cover plate by means of the second temperature-control device using a reference variable, wherein the reference variable is a function of one of the following variables: a setpoint temperature of the sample block, an actual temperature of the sample block, or a regulating variable output by the first controller.

The first and/or the second controller can be designed as electrical or electronic control circuits. The first and/or the second controller may also be realized as software that is run by a microcontroller of the control unit. In this embodiment, the reference variable for the second controller is determined from the setpoint temperature of the sample block, the actual temperature of the sample block, or from the regulating variable output by the first controller. In the simplest case, the second controller or a further component of the control unit connected to the second controller can determine the reference variable for the second controller by adding a value representing the temperature difference between the sample block and the cover plate to the actual temperature of the sample block, to the setpoint temperature of the sample block or to the regulating variable.

In an alternative embodiment, the control unit can be designed to control the temperature of the cover plate and the temperature of the sample block so that said temperatures are coordinated with one another in such a way that it controls the temperature of the sample block as a function of the temperature of the cover plate.

In this embodiment, the control unit may comprise, for example, a first controller which is designed to control the temperature of the sample block by means of the first temperature-control device. The control unit may additionally comprise a second controller which is designed to control the temperature of the cover plate, especially cyclically, by means of the second temperature-control device according to a predetermined setpoint temperature profile, wherein the first controller is designed to control the temperature of the sample block using a reference variable which is a function of one of the following variables: a setpoint temperature of the cover plate, an actual temperature of the cover plate, or a regulating variable output by the second controller.

In contrast to the embodiment described above, in which the temperature of the cover plate is determined based on the temperature of the sample block, in the alternative embodiment described here it is the temperature of the sample block, which is determined based on the temperature of the cover plate.

In this embodiment, the first and/or the second controllers can also be realized as electrical or electronic control circuits and/or as software which can be run by a microcontroller of the control unit. The reference variable may be determined analogously to the embodiment described above.

The apparatus according to the invention is particularly advantageously used for the thermal treatment of samples in sample containers which are combined in a microtiter plate for small sample volumes.

The cover plate may have a planar front surface which is designed to bear against sample containers arranged in the receiving region of the sample block in such a way that the sample containers are sandwiched between the sample block and the cover plate.

In an advantageous embodiment, the cover plate may have a plurality of openings or windows through which optical observation of the sample containers is possible and which are arranged in a, for example, rectangular, central region of the cover plate. In this embodiment, it is possible to analyze the samples in real time simultaneously with the thermal treatment (e.g., so-called real-time PCR). For example, optical measured values, e.g. fluorescence measured values, can be detected between two treatment cycles in each case.

The second temperature-control device may comprise at least one heating element arranged on the cover plate and at least one cooling element, wherein the at least one cooling element is arranged in a peripheral region surrounding the central region of the cover plate which has the openings or windows. Advantageously, a plurality of cooling elements are arranged in the peripheral region.

The at least one heating element can be arranged on or in webs of the cover plate extending between the openings or windows.

In one possible embodiment, the cover plate can comprise of a material produced by powder metallurgy containing copper or silver and comprising at least one refractory metal. Said materials have the advantage of high thermal conductivity with simultaneously comparatively low thermal capacity. The thermal conductivity of the material from which the cover plate is formed is advantageously between 160 and 500 W/m·K and the thermal capacity is between 150 and 300 J/kg·K.

The first temperature-control device can have at least one thermoelectric element in contact with the sample block, for example a Peltier element, and a heat sink in contact with the at least one thermoelectric element. The apparatus advantageously comprises a plurality of Peltier elements.

The method according to the invention for the thermal treatment of samples in sample containers with the aim of DNA amplification comprises the following steps: arranging the sample containers in a receiving region of a sample block; closing the sample containers; covering the sample containers with a cover plate such that the sample containers are arranged between the sample block and the cover plate; controlling a temperature of the sample block by means of a control unit and a first temperature-control device thermally coupled to the sample block and controlled by the control unit for setting the temperature of the sample block; and controlling a temperature of the cover plate by means of the control unit and a second temperature-control device thermally coupled to the sample block and controlled by the control unit for setting the temperature of the cover plate, wherein the temperature of the cover plate and the temperature of the sample block are controlled so that said temperatures are coordinated with one another.

The step of closing the sample containers may be performed before or after arranging the sample containers in the receiving region of the sample block. The sample containers may be closed by means of individual, preferably optically transparent, closures which are each associated with a sample container or, if the sample containers are combined in a microtiter plate, by means of a, preferably optically transparent, sealing film or sealing mat. The closed sample containers are covered by the cover plate.

Various procedures are possible in order to achieve a coordinated control of the temperatures of the cover plate and of the sample block. Three examples are given below.

For example, the temperature of the cover plate and the temperature of the sample block can be controlled so that said temperatures are coordinated with one another in such a way that the temperature of the cover plate is equal to or greater than the temperature of the sample block and that a difference between the temperature of the cover plate and the temperature of the sample block does not exceed a maximum value, especially a predetermined maximum value. The maximum value can be predetermined by the control unit and stored, for example, in a memory of the control unit. As already mentioned, the maximum value may be, for example, a fraction of the difference between the maximum value and the minimum value of the setpoint temperature profile of the sample block or of the samples, e.g., a value of a few degrees Kelvin.

Alternatively or additionally, the temperature of the sample block can be controlled according to a predetermined setpoint temperature profile, wherein the temperature of the cover plate is controlled using a reference variable which is a function of one of the following variables: a setpoint temperature of the sample block, an actual temperature of the sample block or a regulating variable output to the first temperature-control device by the control unit for setting the temperature of the sample block.

The predetermined setpoint temperature profile of the sample block may, for example, be a cyclic temperature profile for performing the PCR in the samples.

Alternatively, the temperature of the cover plate may be controlled in accordance with a predetermined setpoint temperature profile, wherein the temperature of the sample block is controlled using a reference variable which is a function of one of the following variables: a setpoint temperature of the cover plate, an actual temperature of the cover plate or a regulating variable output to the second temperature-control device by the control unit for setting the temperature of the cover plate.

An arrangement for carrying out the method described here according to one of the embodiments and variants indicated comprises an apparatus according to any one of the embodiments described above, designed, for example, as a thermocycler, and a plurality of sample containers containing samples to be thermally treated, wherein the sample containers are combined in a microtiter plate, and wherein the microtiter plate is arranged in a receiving region of the sample block and covered by the cover plate. In this way, the microtiter plate is sandwiched between the sample block and the cover plate.

Particularly advantageously, the apparatus according to the invention and the method according to the invention are used when using sample containers combined in microtiter plates for small sample volumes in the low microliter range, for example those as described in DE 600 26 834 T2 and DE 699 14 220 T2. Despite the relatively small contact surface between the heating block and the individual sample containers formed in the microtiter plate and despite the relatively small distance between the cover plate and the samples contained in the microtiter plate, the described apparatus and the described method allow the sample temperatures to be quickly and precisely set in accordance with a predetermined temperature profile required for PCR. In one possible embodiment, the volume of a single sample container of the microtiter plate or of the sample taken up in a single sample container is between 10 and 20 µl. The sample containers can be designed as wells or recesses of the microtiter plate. The wall thickness of the sample containers combined in the microtiter plate can be selected, at least in a region intended for receiving a liquid sample, such that it is not more than 100 µm, advantageously between 10 and 40 µm.

BRIEF DESCRIPTION OF THE DRAWINGS

In the following, the invention is explained on the basis of the exemplary embodiments shown in the figures. The same reference signs indicate the same parts of the apparatus shown.

Shown are:

FIG. 1 a diagram of the time temperature profile of a sample block, a cover plate and a sample contained in a microtiter plate and arranged between the sample block and the cover plate in a conventional thermocycler during a PCR cycle;

FIG. 2 a schematic sectional view of an apparatus for the thermal treatment of samples;

FIG. 3 a schematic representation of a top view of the apparatus according to FIG. 2; and FIG. 4 a schematic representation of the temperature profile over time of the sample block, of the cover plate and of a sample in the apparatus according to FIGS. 2 and 3.

DETAILED DESCRIPTION

As described at the outset, conventional thermocyclers comprise a sample block which is intended and is designed for receiving sample containers with samples to be thermally treated in sample containers. In order to carry out PCR methods, especially also in real-time PCR applications with simultaneous analysis of the sample, the sample containers and a cover sealing the sample containers, for example a sealing film, are covered with a cover plate which is heated in order to avoid condensate formation on the cover. Microtiter plates with sample containers for small sample volumes accordingly also have a low total height. The temperatures occurring in such an arrangement on the sample block, the cover plate and in the samples in a conventional thermocycler with a temperature control of the sample block and the cover plate according to the prior art are illustrated in the diagram shown in FIG. 1.

Figure 1:
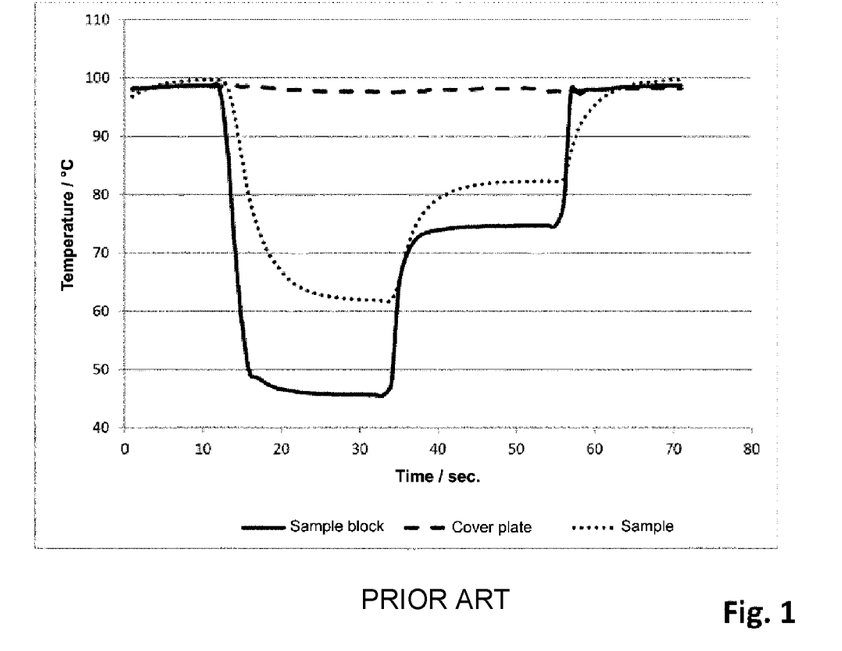
FIG. 1 shows a chart of the time temperature profile of a sample block, a cover plate and a sample contained in a microtiter plate and arranged between the sample block and the cover plate in a conventional thermocycler during a PCR cycle.

The temperature of the sample block (solid line) is controlled in accordance with a predetermined temperature profile for a PCR cycle: In a first time period, the sample block is heated to 95° C. (denaturation phase), the sample block is then cooled to 50° C. (primer hybridization phase) and maintained at this temperature for a second time period. The sample block is then heated again to a temperature of 72° C. (amplification phase). Following this third time period, the sample block is heated again to 95° C. and a new cycle begins. The temperature of the heatable cover plate (dashed line) is kept constant at 95° C. The dotted line represents the profile of the sample temperature. It can be seen that the temperature of the samples does not precisely follow the profile of the temperature of the sample block due to the influence of the heated cover plate on the temperature of the samples. It is particularly disadvantageous that the samples do not reach the final temperature of 50° C. desired for the primer hybridization phase but remain at an actual final temperature of approximately 60° C.

Figure 2:
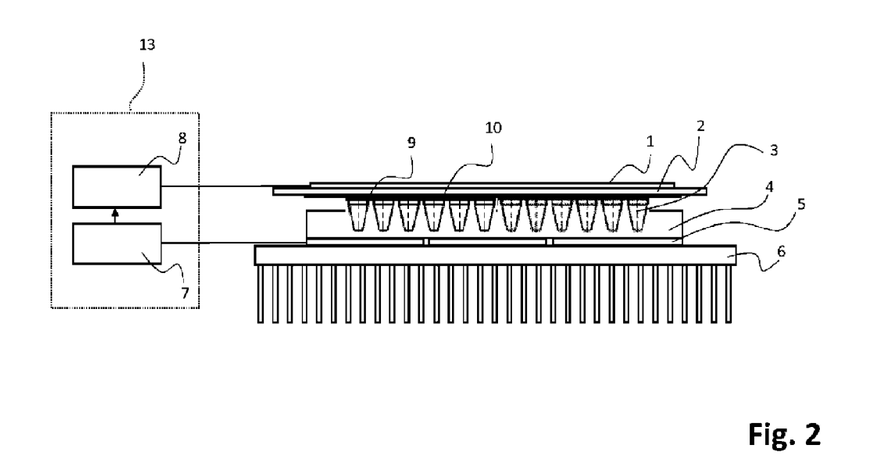
FIG. 2 shows a schematic cross-sectional view of an apparatus for the thermal treatment of samples.

In FIG. 2, an example of an improved apparatus for the temperature control of samples according to the invention is shown schematically in a sectional view. The apparatus has a sample block 4 on the underside of which temperature-control elements 5 are arranged which are in thermal contact with the sample block 4 in order to heat or cool it. The temperature-control elements 5 may be designed, for example, as Peltier elements. On their rear side facing away from the sample block 4, the temperature-control elements 5 are in contact with a heat sink 6. In the present example, the heat sink 6 comprises a plurality of cooling elements for dissipating heat away from the temperature-control elements 5. The temperature-control elements 5 are thus sandwiched between the sample block 4 and the heat sink 6. The sample block 4 is formed from a material with high thermal conductivity, for example from silver or from aluminum. This makes it possible to set the temperature of the sample block 4 quickly by means of the temperature-control elements 5.

On its front side, which is opposite the rear side in contact with the temperature-control elements 5, the sample block 4 has a receiving region for sample containers 9. In the present example, the sample containers 9 are combined in a microtiter plate 3. The microtiter plate 3 used here is a microtiter plate for small volumes. The receiving region of the sample block 4 correspondingly has a surface with recesses for receiving the sample containers 9, which bears against the rear side of the microtiter plate 3.

The microtiter plate 3 is covered by a sealing film 10 which tightly closes the individual sample containers 9 which are designed as wells in the microtiter plate. The microtiter plate 3 with the sealing film 10 is covered by a cover plate 2. The cover plate 2 is thermally coupled to a temperature-control device comprising one or more heating elements 1. In the present example, a single, flat heating element 1 is present. The heating element(s) 1 can, for example, be designed as resistance heating elements.

Figure 3:
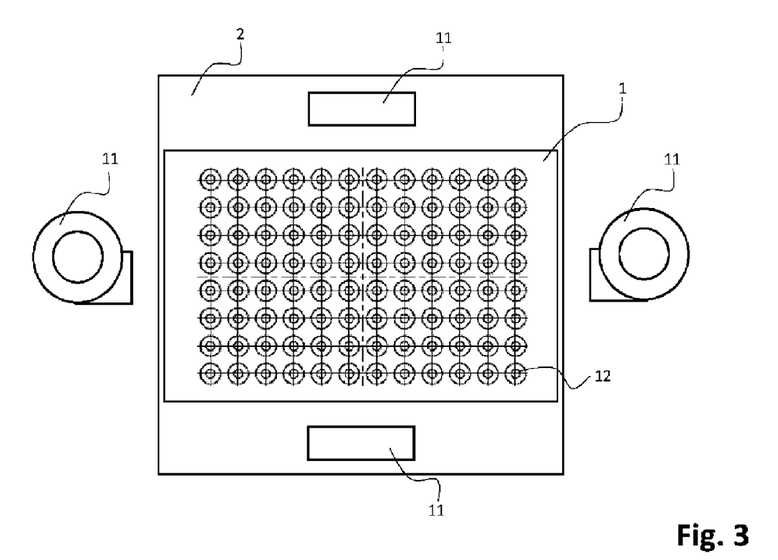
FIG. 3 shows a schematic representation of a top view of the apparatus according to FIG. 2.

FIG. 3 shows a view of the apparatus schematically from above. This representation shows that the heating element 1 has a plurality of openings 12 through which optical measurements, e.g., fluorescence measurements, on samples contained in the sample containers 9 of the microtiter plate 3 is possible. The cover plate 2 may be made of a material that is transparent to the measuring radiation. Alternatively and advantageously, it may be made of a material which is not transparent to the measuring radiation and has low thermal capacity in addition to good thermal conductivity. Suitable materials are refractory metals and refractory metal alloys, e.g., materials produced by powder metallurgy containing copper or silver and comprising at least one refractory metal. Refractory metals are usually understood to be high-melting, non-precious metals of subgroups 4, 5, and 6 of the periodic table of the elements, e.g., titanium, zirconium, hafnium, vanadium, niobium, tantalum, chromium, molybdenum and tungsten, as well as alloys containing one or more of said metals. Advantageous for use as the material of the cover plate 2 are such refractory metals or alloys which have thermal conductivity in the range between 160 and 400 W/m·K and heat capacity between 150 and 300 J/kg·K. For example, a tungsten-copper sintered material having thermal conductivity between 160 and 230 W/m·K and heat capacity between 200 and 250 J/kg·K may be considered. In this case, the cover plate 2 has openings aligned with the openings 12 of the heating element 1, through which measuring radiation can be detected from the sample containers of the microtiter plate 3. The sealing film 10 comprises of a polymer that is transparent to the measuring radiation.

In addition to the heating element 1, the temperature-control device for the cover plate 2 also comprises a plurality of cooling elements 11. In the present example, the cooling elements 11 are arranged on the periphery of the cover plate 2. They may, for example, be Peltier elements, heat pipes or fluid coolers, e.g., water or air coolers.

The apparatus for the thermal treatment of the samples contained in the microtiter plate 3 further comprises a control unit 13, which is electrically connected to the temperature control elements 5 for setting the temperature of the sample block 4 and to the heating element 1 and the cooling elements 11 for setting the temperature of the cover plate 2. The control unit 13 may comprise an electrical or electronic control circuit, especially with a microcontroller with software for running a data memory containing a temperature control. The control unit 13 is designed to control the temperature of the cover plate 2 and the temperature of the sample block 4 so that said temperatures are coordinated with one another. In the present example, the control unit 13 comprises two controllers, namely a first controller 7 for controlling the temperature of the sample block 4 and a second controller 8 for controlling the temperature of the cover plate.

The first controller 7 is designed to determine a regulating variable on the basis of a reference variable which represents the setpoint temperature profile of the PCR cycle and a control variable representing the current actual temperature of the sample block 4 and to output to the temperature-control elements 5 in order to set the temperature of the sample block 4 to the value of the reference variable. The control variable may be determined, for example, by a temperature sensor detecting the current actual temperature of the sample block 4 (not shown in FIGS. 2 and 3). The first controller 7 is further designed to output a signal representing the actual temperature of the sample block 4 to the second controller 8. The signal may be, for example, the reference variable of the first controller 7, the control variable of the first controller 7 or the regulating variable output by the first controller 7 or a signal derived from one of said variables.

The second controller 8 is designed to determine a regulating variable on the basis of a reference variable derived from the signal received by the controller 7 and representing the actual temperature of the sample block 4 and a control variable representing the current actual temperature of the cover plate 2 and to output it to the heating element 1 and/or to the cooling elements 11 in order to set the temperature of the cover plate 2 to the value of the reference variable. The control variable may be, for example, a temperature of the cover plate 2 detected by a temperature sensor (not shown in FIGS. 2 and 3). The reference variable for the second controller 8 may be determined based on the signal provided by the first controller 7 in such a way that it corresponds to a setpoint temperature of the cover plate 2 that is equal to the actual temperature of the sample block 4 or is higher than the actual temperature of the sample block 4 by a few Kelvin, for example, 2 to 10 K.

An example of a method for the thermal treatment of samples in sample containers with the aim of DNA amplification is described below. In the exemplary embodiment described here, the method is carried out by means of the apparatus shown in FIGS. 2 and 3. First, the sample-containing sample containers 9, which are combined in the microtiter plate 3, are arranged in the receiving region of the sample block 4. The sample containers 9 are previously or subsequently closed, for example by means of a sealing film 10 which is placed or glued onto the microtiter plate 3. The sample containers 9 are then covered with the cover plate 2. The microtiter plate 3 is then sandwiched between the sample block 4 and the cover plate 2. The temperature of the cover plate 2 and the temperature of the sample block 4 are controlled so that said temperatures are coordinated with one another by means of the control unit 13 such that the samples pass through a desired temperature profile, for example a temperature profile serving DNA amplification by means of PCR. For this purpose, the control unit 13 may control the temperature of the cover plate 2 and of the sample block so that said temperatures are coordinated with one another such that the temperature of the cover plate 2 is equal to or greater than the temperature of the sample block 4 and such that the difference between the temperature of the cover plate 2 and the temperature of the sample block does not exceed a maximum value. In the present exemplary embodiment, this maximum value may be a few Kelvin, e.g., 2 to 10 K.

In the present exemplary embodiment, the temperature of the cover plate 2 is controlled as a function of the temperature of the sample block 4. By means of the first controller 7 of the control unit 13, the temperature of the sample block 4 is controlled for the thermal treatment of the samples, in the present example namely according to a profile predetermined for the PCR cycles. For this purpose, the first controller 7 controls the temperature-control elements 5 thermally coupled to the sample block 4 using a reference variable corresponding to the desired setpoint temperature profile of the PCR cycles and a control variable detected by means of a temperature sensor and representing the current actual temperature of the sample block 4. The controller 7 determines a regulating variable from the reference and control variables and outputs it to the temperature-control elements 5 in order to set the temperature of the sample block 4 to the value of the reference variable.

The first controller also outputs a signal representing the actual temperature of the sample block 4 to the second controller 8, which signal is, for example, the reference variable of the first controller 7, the control variable of the first controller 7 or the regulating variable output by the first controller 7 or a signal derived from one of said variables. The second controller 8 determines its reference variable from the signal, for example in the simplest case by adding an amount representing a desired temperature difference between the sample block 4 and the cover plate 2 to the value of the signal. The reference variable thus determined corresponds to a setpoint temperature of the cover plate 2 which is higher than the current actual temperature of the sample block 4 by the desired temperature difference. The second controller controls the temperature of the cover plate 2 based on the determined reference variable and a control variable representing the current actual temperature of the cover plate 2, which control variable can be determined, for example, by means of a temperature sensor. For this purpose, it can output a regulating variable to the heating element 1 and/or to the cooling elements 11 in order to set the temperature of the cover plate 2 to the value of the reference variable.

Figure 4:
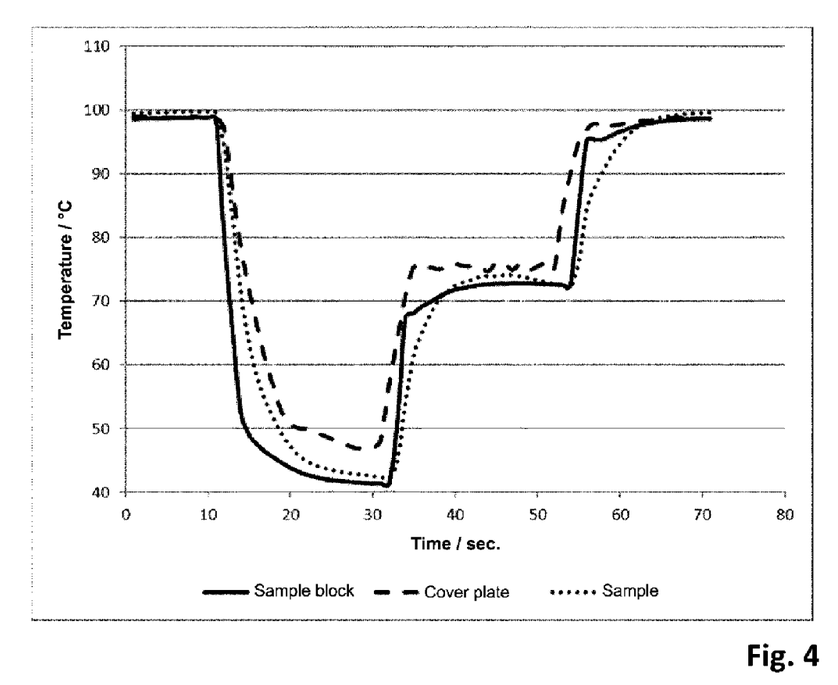
FIG. 4 shows a schematic representation chart of the temperature profile over time of the sample block, of the cover plate and of a sample in the apparatus according to FIGS. 2 and 3.

The profiles of the temperatures of the sample block 4, of the cover plate 2, and of a sample contained in the microtiter plate 3 in the course of the described method are shown in a schematic representation in FIG. 4. The temperature of the sample block 4 (solid line) follows the predetermined temperature profile for a PCR cycle. It substantially corresponds to the temperature profile of the sample block with the denaturation phase, the primer hybridization phase, and the amplification phase, as shown in FIG. 1. In contrast to the embodiment shown in FIG. 1 according to prior art, the temperature of the cover plate 2 of the apparatus shown in FIGS. 2 and 3 does not constantly remain at a high value. Rather, by means of the described control, which is a function of the temperature of the sample block 4, the temperature of the cover plate 2 (dashed line) is always adapted to the temperature profile of the sample block 4 so that a temperature difference between the cover plate 2 and the sample block 4 does not exceed a maximum value of 10 K. From FIG. 4 it can be seen that, as a result of this temperature control of the cover plate 2, the temperature of the sample (dotted line) substantially follows the temperature profile of the sample block 4 with significantly improved speed and precision. It should be noted, especially, that during the second time period of the cycle, i.e., during the primer hybridization phase, the final temperature of the sample reaches the value predetermined by the sample block 4 after a short cooling phase.

The invention comprises a plurality of variants and variations of the exemplary embodiment described herein. For example, it is also possible for a temperature sensor that detects the current actual temperature of the sample block to output a signal representing the actual temperature of the sample block to the second controller of the control unit in order to derive the reference variable of the second controller.

In a further variation of the exemplary embodiment of an apparatus and a method detailed here for the thermal treatment of samples, it is possible for a first controller connected to the temperature-control elements for the sample block to control the temperature of the sample block as a function of the temperature of the cover plate controlled by a second controller. In this case, a reference variable representing the course of the PCR cycles is specified to the second controller, while the first controller receives from the second controller a signal representing the actual temperature of the cover plate, on the basis of which the reference variable of the first controller is determined for the temperature control of the sample block.

A plurality of other variants is conceivable without departing from the inventive idea.

The invention claimed is:

1. An apparatus for the thermal treatment of samples contained in sample containers, the apparatus comprising:
 a sample block, including a receiving region adapted to receive the sample containers;

a first temperature-control device thermally coupled to the sample block and configured to set a temperature of the sample block;

a cover plate configured for the sample containers and dispose in the receiving region of the sample block, wherein the cover plate includes a plurality of openings or windows arranged in a central region thereof and configured to enable optical observation of the sample containers, and wherein the cover plate comprises a material with a thermal conductivity of 160-500 W/mK and a thermal capacity of 150-300 J/kg·K;

a second temperature-control device thermally coupled to the cover plate and configured to set a temperature of the cover plate, wherein the second temperature-control device includes at least one heating element disposed on the cover plate and at least one cooling element arranged in a peripheral region about the central region of the cover plate; and a control unit connected to the first temperature-control device and the second temperature-control device and configured to control the first temperature-control device and the second temperature-control device, wherein the control unit is configured to control the temperature of the sample block and the temperature of the cover plate using the first temperature-control device and the second temperature-control device such that the temperatures of the sample block and the cover plate are coordinated with each other.

2. The apparatus of claim 1, wherein the control unit is configured to control the temperature of the cover plate and the temperature of the sample block such that the temperature of the cover plate is equal to or greater than the temperature of the sample block and such that a difference between the temperature of the cover plate and the temperature of the sample block does not exceed a maximum value.

3. The apparatus of claim 2, wherein the maximum value is predetermined.

4. The apparatus of claim 1, wherein the control unit is configured to control the temperature of the cover plate and the temperature of the sample block such that the temperatures of the sample block and the cover plate are coordinated with each other such that the temperature of the cover plate is a function of the temperature of the sample block.

5. The apparatus of claim 1, wherein the control unit comprises a first controller configured to control the temperature of the sample block via the first temperature-control device according to a predetermined setpoint temperature profile.

6. The apparatus of claim 5, wherein the control unit comprises a second controller configured to control the temperature of the cover plate via the second temperature-control device using a reference variable, and wherein the reference variable is a function of one of the following variables: a setpoint temperature of the sample block, the temperature of the sample block and a regulating variable output by the first controller.

7. The apparatus of claim 5, wherein the first controller is configured to cyclically control the temperature of the sample block.

8. The apparatus of claim 1, wherein the control unit is configured to control the temperature of the cover plate and the temperature of the sample block such that the temperatures of the sample block and the cover plate are coordinated with each other such that the temperature of the sample block is a function of the temperature of the cover plate.

9. The apparatus of claim 8, wherein the control unit comprises a first controller configured to control the temperature of the sample block via the first temperature-control device, and wherein the control unit comprises a second controller configured to control the temperature of the cover plate via the second temperature-control device according to a predetermined setpoint temperature profile, and wherein the first controller is configured to control the temperature of the sample block using a reference variable that is a function of one of the following variables: a setpoint temperature of the cover plate, the temperature of the cover plate and a regulating variable output by the second controller.

10. The apparatus of claim 9, wherein the second controller is configured to cyclically control the temperature of the cover plate.

11. The apparatus of claim 1, wherein the cover plate has a planar front surface and is configured to bear against the sample containers disposed in the receiving region of the sample block such that the sample containers are disposed between the sample block and the cover plate.

12. The apparatus of claim 1, wherein the at least one heating element is disposed on or in webs of the cover plate, which extend between the plurality of openings or windows.

13. The apparatus of claim 1, wherein the cover plate comprises a material produced by powder metallurgy containing copper or silver and includes at least one refractory metal.

14. The apparatus of claim 1, wherein the first temperature-control device includes at least one thermoelectric element in contact with the sample block and a heat sink in contact with the at least one thermoelectric element.

15. An arrangement for thermal treatment of samples in sample containers to facilitate DNA amplification, the arrangement comprising:

an apparatus according to claim 1; and a plurality of sample containers containing the samples to be thermally treated, wherein the sample containers are combined in a microtiter plate, and wherein the microtiter plate is disposed in the receiving region of the sample block and covered by the cover plate.

16. A method for thermal treatment of samples in sample containers to facilitate DNA amplification, the method comprising:

introducing the sample containers into a receiving region of a sample block;

closing off the sample containers;

covering the sample containers with a cover plate such that the sample containers are disposed between the sample block and the cover plate, wherein the cover plate includes a plurality of openings or windows arranged in a central region thereof and configured to enable optical observation of the sample containers, and wherein the cover plate comprises a material with a thermal conductivity of 160-500 W/mK and a thermal capacity of 150-300 J/kg·K;

controlling a temperature of the sample block via a control unit and a first temperature-control device thermally coupled to the sample block and controlled by the control unit as to set the temperature of the sample block; and controlling a temperature of the cover plate via the control unit and a second temperature-control device thermally coupled to the sample block and controlled by the control unit as to set the temperature of the cover plate, wherein the second temperature-control device includes at least one heating element disposed on the cover plate and at least one cooling element arranged in a peripheral region about the central region of the cover plate, wherein the temperature of the cover plate and the temperature of the sample block are controlled such that the temperatures are coordinated with each other.

17. The method of claim 16, wherein the temperature of the cover plate and the temperature of the sample block are controlled such that the temperatures are coordinated with each other such that the temperature of the cover plate is equal to or greater than the temperature of the sample block and such that a difference between the temperature of the cover plate and the temperature of the sample block does not exceed a maximum value.

18. The method of claim 17, wherein the maximum value is predetermined.

19. The method of claim 16, wherein the temperature of the sample block is controlled according to a predetermined setpoint temperature profile, and wherein the temperature of the cover plate is controlled using a reference variable which is a function of one of the following variables: a setpoint temperature of the sample block, the temperature of the sample block, and a regulating variable, which is output to the first temperature-control device by the control unit for setting the temperature of the sample block.

20. The method of claim 16, wherein the temperature of the cover plate is controlled according to a predetermined setpoint temperature profile, and wherein the temperature of the sample block is controlled using a reference variable that is a function of one of the following variables: a setpoint temperature of the cover plate, the temperature of the cover plate, and a regulating variable, which is output to the second temperature-control device by the control unit for setting the temperature of the cover plate.

21. The method of claim 16, wherein the closing off of the sample containers includes closing off the sample containers using a sealing film.

* * * * *